UNITED STATES PATENT OFFICE.

MARK L. DEERING, OF CLEVELAND, OHIO.

COMPOSITION OF MATTER.

SPECIFICATION forming part of Letters Patent No. 408,222, dated August 6, 1889.

Application filed June 21, 1888. Serial No. 277,820. (No specimens.)

*To all whom it may concern:*

Be it known that I, MARK L. DEERING, of Cleveland, in the county of Cuyahoga and State of Ohio, have invented certain new and useful Composition of Matter; and I do hereby declare the following to be a full, clear, and exact description of the invention, such as will enable others skilled in the art to which it pertains to make and use the same.

My invention relates to a new composition of matter to be used in making various articles—such, for instance, as electric insulators, vessels, utensils, knobs, buttons, ornaments, &c.

The ingredients for the new composition are fibrous material, blood, water-proof gum, and creosote, and, for general purposes, preferably in about the proportion of one pound of fiber to one quart of blood. For most purposes the fibrous material consists of wood pulp, on account of the cheapness of the wood pulp, and the latter being reduced to a liquid state by intermixture with water, and while in such liquid state the liquid blood is thoroughly mixed therewith, after which the mass is raised to a temperature, say, from 170° to 200° Fahrenheit. I may mention here that if a fire-proof material is sought some mineral fiber—such, for instance, as asbestus—had better be substituted for the wood pulp, either wholly or in part. Next the mass is pressed into sheets, slabs, or blocks, that may be recut into dimensions, as required, or the mass may be pressed into molds, as would be the case in making vessels, knobs, buttons, and a great variety of articles. While the material is in the former or mold, heat may be applied to dry and to (so called) "vulcanize"—that is, harden—the composition. The degree of heat applied should not be so great as to scorch or injure the material, and at the same time the greater the degree of heat applied the quicker the hardening process will be completed. About 350° Fahrenheit I consider the maximum, above which the fibrous material is likely to be injured, and from 250° to 350° Fahrenheit will give good results. The time required for this vulcanizing or hardening process will depend partly on the degree of heat applied and partly on the thickness of the material being treated. For instance, a thin article—say an eighth of an inch in thickness and subjected to, say, 350° of heat—will be vulcanized or hardened usually in from three to five minutes. Without such vulcanizing method the composition is left to dry by natural causes, or, if simply kiln-dried, will not be so hard as the vulcanized product and will be of somewhat inferior grade generally. The composition thus produced, either with or without the vulcanizing process, is comparatively light in weight, is hard and strong, and is susceptible of a fine polish or finish. The composition is a good non-conductor both of heat and of electricity, and is so refractory that it may properly be classed as fire-proof. The composition is impervious to oil, and vessels made thereof may be safely used for storing or shipping hydrocarbon oils. The water-proof gum should be added either before or after heating. For a cheap article rosin will answer the purpose well; but for better grades gum-shellac or gum-copal had better be used. From two to five per cent. of such water-proof material, more or less, according to the purpose for which the composition is intended, may be used. After the blood and fiber have been mixed and heated to from 170° to 200° Fahrenheit, as aforesaid, one or two per cent. of creosote is added to the mass, which will improve the texture of the product and make it more plastic and of finer texture, resembling more closely horn.

In regard to the proportions in which the blood and fibrous material are mixed I will state that if more blood is used the product will be harder and finer-grained. On the other hand, if a larger percentage of fibrous material is used the product will be softer and more porous and flexible. The proportion therefore of blood and fibrous material may be varied greatly, according to the purposes for which the composition is to be used.

I will also observe that in place of wood pulp or even straw pulp for cheap material linen or other more costly fiber may be used where a finer product is desired.

What I claim is—

A new composition of matter, consisting of fibrous material, blood, water-proof gum, and creosote, substantially as set forth.

In testimony whereof I sign this specification, in the presence of two witnesses, this 3d day of April, 1888.

MARK L. DEERING.

Witnesses:
CHAS. H. DORER,
ALBERT E. LYNCH.